United States Patent [19]
Puyplat

[11] 3,849,642
[45] Nov. 19, 1974

[54] MOTOR VEHICLE HEADLAMPS
[75] Inventor: Olivier Puyplat, Paris, France
[73] Assignee: Cibie Projecteurs, Bobigny, France
[22] Filed: July 10, 1973
[21] Appl. No.: 377,999

[30] Foreign Application Priority Data
July 20, 1972 France ............................. 72.26205
Mar. 27, 1973 France ............................. 73.06856

[52] U.S. Cl. ............ 240/41.3, 240/7.1 R, 240/41 R
[51] Int. Cl. ........................................ F21v 13/04
[58] Field of Search .............. 240/41.3, 46.55, 41 R, 240/41 BM, 7.1 R, 8.1

[56] References Cited
UNITED STATES PATENTS
1,451,893   4/1923   Ryan .................................. 240/41.3
2,054,286   9/1936   Greenmum ...................... 240/46.55
2,094,689  10/1937   Wells .................................. 240/41.3
3,290,497  12/1966   Ragle et al. ...................... 240/46.55
3,484,599  12/1969   Little .................................. 240/41.3

Primary Examiner—Richard L. Moses
Attorney, Agent, or Firm—Breitenfeld & Levine

[57] ABSTRACT

A vehicle headlamp incorporates a front lens and an intermediate lens of corrugated form or provided with similar relief patterns, the intermediate lens being disposed between the front lens and the dippedbeam filament of the lamp. The arrangement provides optimum dispersion of the dipped beam even when the front lens is disposed at a considerable distance from the focus of the parabolic mirror.

10 Claims, 3 Drawing Figures

MOTOR VEHICLE HEADLAMPS

BACKGROUND OF THE INVENTION

Many motor vehicle headlamps which are adapted to emit either a dipped-beam or a main beam incorporate a parabolic mirror, a lamp connected to the mirror so that its dipped-beam filament is disposed in front of the focus of the mirror, and a front lens comprising at least one system of corrugations or similar relief patterns which are adapted to provide a predetermined dispersion of at least part of the dipped-beam rays emitted by the dipped-beam filament of the lamp and reflected by at least part of the mirror.

The spacing of the front lens from the filament is often dictated by the shape of the recess in the vehicle which is adapted to receive the headlamp and moreover the front lens is often appreciably inclined with respect to the axis of the mirror in order that it can match the shape of the vehicle bodywork for reasons of appearance and aerodynamics. Apart from this inclination, these configurations frequently make it necessary to dispose the front lens at a considerable distance from the filament.

When a dipped-beam filament is disposed in front of the focal point of the parabolic mirror the beam made up of the rays of light reflected by the back part of the mirror, and more precisely by the upper portion of said back part due to the inclusion of a shield, converges towards the axis so that there tends to be a luminous concentration of all the images of the filament produced by the different parts of the back part of the mirror near the axis and a few decimeters in front of the focus. It is therefore no longer possible to provide a system of corrugations or like relief patterns in the central part of the front lens near the axis of the mirror to obtain optimum luminous distribution of the reflected dipped-beam.

It is accordingly a principal object of the present invention to provide a vehicle headlamp wherein optimum luminous dispersion of the dipped-beam can be obtained even where the front lens is disposed at a considerable distance from the focus of the parabolic mirror.

SUMMARY OF THE INVENTION

The invention provides a motor vehicle headlamp comprising a parabolic mirror, a lamp having a dipped-beam filament disposed in front of the focus of the mirror, a front lens, and an auxiliary lens positioned between the lamp and the front lens, each lens being adapted to disperse light received from the lamp via the mirror.

With an arrangement of this kind the auxiliary lens can effect optimum dispersion of that part of the dipped-beam which is reflected by the central part of the parabolic mirror since the auxiliary lens can be so positioned as to intercept the images of the dipped-beam filament whilst they are still separated. Thus the dipped-beam filament can deflect the dipped-beam in any desirable direction by appropriate corrugations or similar relief patterns on the auxiliary lens.

Preferably the dipped-beam filament includes a shield whereby the majority of the light from that filament is directed to a part of the mirror to one side of its axis, and a major part of the auxiliary lens is positioned to the same side of the axis in order to intercept a substantial part of the reflected dipped-beam. With such a construction that part of the dipped-beam which is reflected by the peripheral part of the mirror, and which has a lesser convergency effect than the central part of the beam reflected by the central part of the mirror need not be affected by the auxiliary lens but is merely dispersed in any desirable manner by a system of corrugations or similar relief patterns in peripheral regions of the front lens.

In an alternative construction having the same basic effect as in the preceding paragraph the auxiliary lens is symmetrically disposed with respect to the mirror axis but does not intercept light reflected from peripheral regions of the mirror.

The fact that the front lens is no longer required to carry out dispersion functions means that it need not necessarily have corrugation systems or similar relief patterns in its central zone near the axis of the mirror. This enables the shape of the front lens to be simplified so that its cost can be reduced which is relatively important in view of the frequently complex shape of this lens.

Another advantage of the present invention is that headlamps may be provided with a plurality of lamps of different types at moderate price. An appropriate auxiliary lens can be incorporated for each type of lamp but the front lens being provided with a common system of corrugations or similar relief patterns to embrace all the types of lamps in question. It is then possible to change the type of lamp and its auxiliary lens at a relatively low cost.

DESCRIPTION OF PREFERRED EMBODIMENTS

The invention may be carried into practice in a number of ways but three specific embodiments will now be described by way of example with reference to the accompanying drawings, each of which comprises a diagrammatic sectional side elevation of a headlamp according to the present invention.

In each embodiment a generally parabolic mirror 10 is included which is connected to, or is integral with, a metal supporting casing in conventional manner.

The mirror surface may be produced by applying a reflecting material to the concave inner parabolic surface or alternatively it is possible to provide an independent mirror, for example of rigid plastics material and to fix such mirror to the casing, for example by adhesion or other means.

In each of the embodiments the headlamp is completed by a front lens 14 again secured to the casing 12 by any known means and having an outer configuration which may be styled to suit the vehicle in which the headlamp is to be incorporated.

Figure 1:
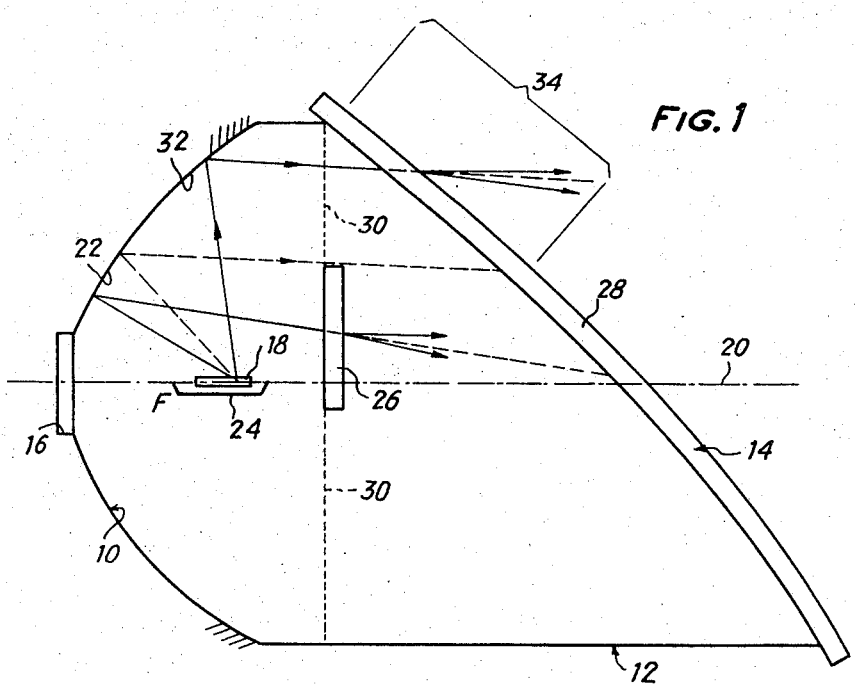
Figure 2:
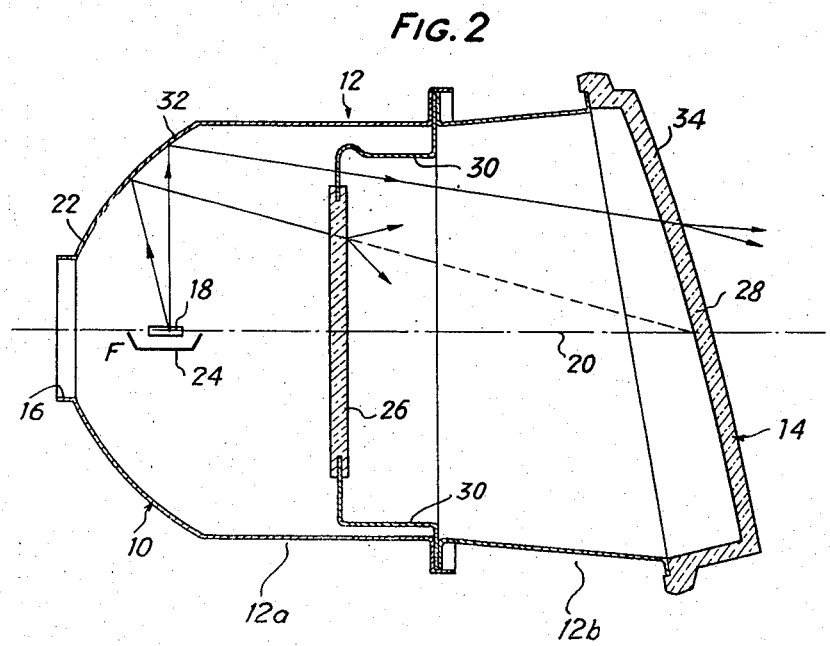
Figure 3:
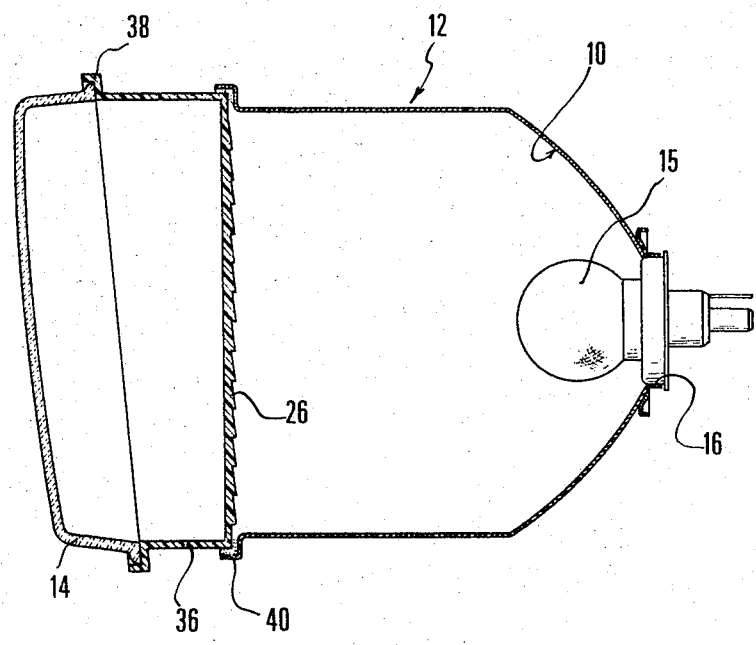

Whilst a lamp 15 is shown in an aperture 16 in the casing 12 in the embodiment of FIG. 3, the lamp proper is omitted for clarity in FIGS. 1 and 2. In FIGS. 1 and 2 the lamp would be so disposed that its dipped-beam filament 18 which is generally cylindrical, is situated substantially along the axis 20 of the mirror 10 at a position in front of the focus F of the mirror, i.e., on the side of the focus furthest from the mirror.

In order to provide a dipped beam, the filament 18 is surrounded on its underside by a shield 24 so as to provide a distinct separation between the zones which are or are not illuminated by the headlamp. This method of mounting the filament in front of the focus F in conjunction with the shield 24 to provide a dipped beam of the headlamp is known per se.

Referring to each of the embodiments an auxiliary corrugated or similarly relief-formed dioptric system 26 is interposed in the path of the rays of light emitted by the filament 28. In the case of FIG. 1, the system 26 intercepts only a part of the reflected light from the back part 22 of the mirror 10, in this case above the axis 20. At the system 26 the images of the filament 18 provided by the different points of the central part 22 of the mirror 10 are still sufficiently separated to be able to be conveniently distributed, whereas at the central zone 28 of the front lens 14 adjacent the mirror axis 20, the concentration effect due to the position of the focus F and the distance of the front lens from the mirror would produce a concentration of the images over a very narrow zone so that, at the said zone 28, it is impossible satisfactorily to distribute the light concentrated there. The system 26 consists essentially of a substantially plane lens provided with one or more systems of corrugations or similar relief patterns and which is held by any suitable means such as lugs 30 within the casing 12 between the filament 18 and the front lens 14 and extending substantially perpendicularly to the axis 20.

In the embodiment of FIG. 2 the auxiliary system 26 is symmetrically disposed with respect to the axis 20 but again does not intercept all light issuing from the reflecting surface 10. It only intercepts light reflected from the part 22 of the mirror nearest the axis, the peripheral part 32 reflecting light past the system 26. This light which is not intercepted by the system 26 is dispersed by one or more systems of corrugations or similar relief patterns formed in the corresponding peripheral portion 34 of the front lens 14. Obviously, hovever, the central part 28 of the lens 14 may also include a system or systems of corrugations adapted to combine with those of the system 26 so as to modify the light dispersion if required.

Whilst, therefore, in FIG. 1 the system 26 is effective for the dipped beam rays produced by the filament 18 and the shield 14, the system 26 in FIg. 2 also disperses part of the light of the beam of the main beam filament (not shown) which is generally disposed between the back part 22 of the mirror 10 and the focus F of the mirror.

Referring again to FIG. 2, the casing 12 is in fact made up of two connected parts, namely a deep-drawn back part 12a supporting or forming the mirror 10 and an intermediate connecting part in the form of a collar 12b which is positioned between the front lens 14 and the first part 12a. The lugs 30 holding the auxiliary lens 26 are conveniently fixed to the supporting casing at the junction between the two parts 12a and 12b.

In the embodiment of FIg. 3 the auxiliary system 26 extends across the whole of the unit to ensure distribution of the whole of the beam of light reflected by the mirror 10 before it reaches the front lens 14. The front lens 14 in turn comprises one or more systems of corrugations or similar relief patterns to ensure the required distribution of the dipped and main beams of the headlamp.

In any one of the embodiments the auxiliary lens 26 is preferably made of a colourless or a yellow transparent plastics material. In the embodiment of FIG. 3 it may be provided with an integral connecting collar 36 which is similar, as regards function, to the part 12b of FIG. 2 and provides for a connection between the two lenses 14 and 26 and the casing 12. Specifically the collar 36, which is integrally moulded with the lens 26, is preferably painted or aluminized on one of its surfaces. Its front free edge has a rim 38 to which the edge of the front lens 14 is fixed in sealing-tight relationship, for example by adhesive. The combined collar 36 and lens 26 is also fixed in sealing-tight relationship by a bead of glue in a flared aperture 40 of the casing 12. Fixing the front lens on the casing 12 in this way has the advantage of extremely simple assembly, rigidity and low cost.

What I claim as my invention and desire to secure by letters Patent is:

1. A motor vehicle headlamp comprising a parabolic mirror, a lamp having a dipped-beam filament disposed in front of the focus of the mirror, the mirror having a central part immediately surrounding the lamp and a peripheral part surrounding the central part, a front lens provided with relief patterns for intercepting and dispersing at least a part of the reflected dipped beam, and an auxiliary lens positioned between the lamp and the front lens, the auxiliary lens being provided with relief patterns for intercepting and dispersing at least that part of the dipped beam which is reflected by the central part of the mirror.

2. A motor vehicle headlamp according to claim 1 in which the relief patterns of the front lens are positioned to intercept and disperse at least that part of the dipped beam which is reflected by the peripheral part of the mirror.

3. A motor vehicle headlamp according to claim 1 in which the relief patterns of the auxiliary lens are arranged to intercept and disperse only that part of the dipped beam reflected by the central part of the mirror but not that part of the dipped beam reflected by the peripheral part of the mirror.

4. A motor vehicle headlamp according to claim 3 in which the relief patterns of the front lens are arranged to intercept and disperse only that part of the dipped beam reflected by the peripheral part of the mirror and not that part of the dipped beam which passes through the relief patterns of the auxiliary lens.

5. A motor vehicle headlamp according to claim 1, in which the two lenses are connected to the mirror by means of a supporting casing to which they are fixed so as to form a unitary assembly.

6. A motor vehicle headlamp according to claim 1, in which the auxiliary lens is made of transparent plastics material and is connected at its periphery to the parabolic mirror.

7. A motor vehicle headlamp according to claim 6, in which the auxiliary lens is provided at its periphery with a connecting collar which is adapted to secure the front lens to the parabolic mirror.

8. A motor vehicle headlamp according to claim 7, in which the front lens is sealed to a free edge of the connecting collar, the collar having a base which is in turn sealed to the parabolic mirror.

9. A motor vehicle headlamp according to claim 8, in which the connecting collar is made of plastics material and is integrally molded with the auxiliary lens.

10. A motor vehicle headlamp according to claim 1, in which the dipped beam filament includes a shield whereby the majority of the light from that filament is directed to a part of the mirror to one side of its axis, and a major part of the auxiliary lens is positioned to the same side of the axis in order to intercept a substantial part of the reflected dipped beam.

* * * * *